(12) United States Patent
Sumiyoshi et al.

(10) Patent No.: US 10,946,743 B2
(45) Date of Patent: Mar. 16, 2021

(54) DISPLAY CONTROL DEVICE

(71) Applicant: Mitsubishi Electric Corporation, Tokyo (JP)

(72) Inventors: Yuki Sumiyoshi, Tokyo (JP); Takayoshi Chikuri, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/472,057

(22) PCT Filed: Jan. 31, 2017

(86) PCT No.: PCT/JP2017/003389
§ 371 (c)(1),
(2) Date: Jun. 20, 2019

(87) PCT Pub. No.: WO2018/142457
PCT Pub. Date: Aug. 9, 2018

(65) Prior Publication Data
US 2020/0108719 A1   Apr. 9, 2020

(51) Int. Cl.
| | | |
|---|---|---|
| *G09G 5/38* | (2006.01) | |
| *B60K 35/00* | (2006.01) | |
| *G02B 27/01* | (2006.01) | |
| *G06F 3/01* | (2006.01) | |

(52) U.S. Cl.
CPC .......... *B60K 35/00* (2013.01); *G02B 27/0101* (2013.01); *G06F 3/011* (2013.01);
(Continued)

(58) Field of Classification Search
CPC ........ G06F 3/011; G06F 3/013; G06F 3/0428; G09G 5/38; G09G 5/36; G02B 27/0101;
(Continued)

(56) References Cited

U.S. PATENT DOCUMENTS 9,041,740 B2 * 5/2015 Sugiyama ............. G06T 19/006
345/633
10,365,485 B2 * 7/2019 Ogawa ............... G02B 27/0149
(Continued)

FOREIGN PATENT DOCUMENTS

| JP | 5-18951 U | 3/1993 |
| JP | 2015-182672 A | 10/2015 |
| JP | 2016-55756 A | 4/2016 |

OTHER PUBLICATIONS

German Office Action, dated May 13, 2020, for German Application No. 112017006159.8, with an English translation.
(Continued)

*Primary Examiner* — Vijay Shankar
(74) *Attorney, Agent, or Firm* — Birch, Stewart, Kolasch & Birch, LLP.

(57) ABSTRACT

Disclosed is a display control device mounted in a vehicle and including: an irradiation control unit for controlling an irradiating unit that irradiates a road surface with reference light; and a projection control unit for controlling a projecting unit that projects an image onto a reflecting unit that reflects the image, in which the irradiation control unit instructs the irradiating unit to perform irradiation with the reference light, the irradiation corresponding to set irradiation distance information, and the projection control unit instructs the projecting unit to perform projection of an image in such a way that a virtual image corresponding to the irradiation distance information is visually recognized by an occupant of the vehicle, and also controls either a projection position or a projection size of the image projected by the projecting unit on the basis of an instruction of the occupant.

8 Claims, 12 Drawing Sheets

(52) U.S. Cl.
CPC ............... *G06F 3/013* (2013.01); *G09G 5/38* (2013.01); *B60K 2370/1529* (2019.05); *B60K 2370/334* (2019.05)

(58) Field of Classification Search
CPC .. G02B 27/01; B60K 35/00; B60K 2370/334; B60K 2370/1529
See application file for complete search history.

(56) References Cited

U.S. PATENT DOCUMENTS

| | | | | |
|---|---|---|---|---|
| 2002/0109648 A1* | 8/2002 | Sugiyama | ............... | B60K 35/00 345/7 |
| 2009/0278677 A1* | 11/2009 | Arie | ..................... | B60K 37/02 340/461 |
| 2011/0175798 A1* | 7/2011 | Sato | ..................... | B60K 35/00 345/7 |
| 2013/0176335 A1* | 7/2013 | Sugiyama | ............... | B60K 35/00 345/633 |
| 2016/0025976 A1* | 1/2016 | Ogawa | ............... | G02B 27/0149 359/630 |
| 2016/0203629 A1* | 7/2016 | Takeda | ................... | G01C 21/36 345/632 |

OTHER PUBLICATIONS

International Search Report (PCT/ISA/210) issued in PCT/JP2017/003389, dated Apr. 4, 2017.

* cited by examiner

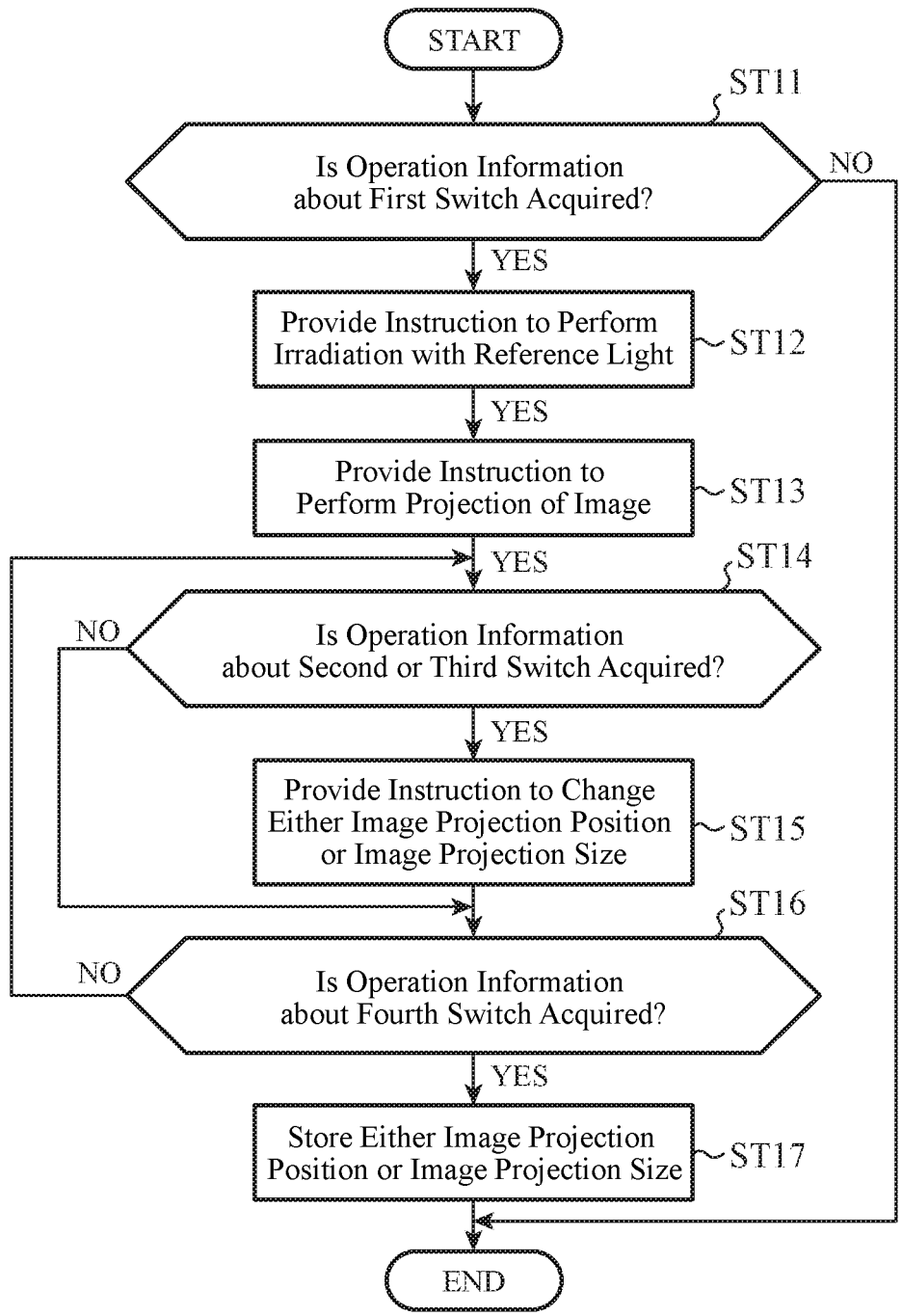

DISPLAY CONTROL DEVICE

TECHNICAL FIELD

The present invention relates to a display control device, a display control method, and a calibration system.

BACKGROUND ART

A head up display that enables the driver of a vehicle to visually recognize a virtual image superimposed on a view in front of the vehicle has become widespread. A head up display is configured to project an image onto a combiner or the like in such a way that a reflected image in the combiner or the like enters the driver's eyes. As such a head up display, there exists a head up display that can adjust the position of a virtual image visually recognized through a combiner. For example, in a head up display of Patent Literature 1, the driver can specify, on a display in the vehicle, the position of a virtual image which he or she visually recognizes through a combiner on the basis of both a view in front of the vehicle which he or she visually recognizes through the combiner, and an image of an area in front of the vehicle, the image being captured by a camera and displayed on the display.

CITATION LIST

Patent Literature

Patent Literature 1: Japanese Unexamined Patent Application Publication No. 2015-182672

SUMMARY OF INVENTION

Technical Problem

In the head up display disclosed in Patent Literature 1, the position of the virtual image visually recognized through the combiner is specified on the basis of both the view in front of the vehicle which is visually recognized through the combiner, and the image of the area in front of the vehicle, the image being captured by the camera and displayed on the display in the vehicle. In this case, even though the position of the virtual image is adjusted on the display, this adjustment being caused by the difference between the view in front of the vehicle which is visually recognized through the combiner and the image of the area in front of the vehicle, the image being captured by the camera, there is a possibility that the position of the virtual image deviates an area in front of the vehicle is actually and visually recognized through the combiner.

The present invention is made in order to solve the above-mentioned problem, and it is therefore an object of the present invention to provide a display control device, a display control method, and a calibration system that adjust a position at which a virtual image is visually recognized without using an image of an area in front of a vehicle, the image being captured by a camera, thereby preventing the position at which the virtual image is visually recognized from deviating.

Solution to Problem

According to the present invention, there is provided a display control device mounted in a vehicle and including: a processor; and a memory storing instructions which, when executed by the processor, causes the processor to perform processes of: controlling an irradiating unit that irradiates a road surface with reference light; and controlling a projecting unit that projects an image onto a reflecting unit that reflects the image, wherein the processor instructs the irradiating unit to perform irradiation with the reference light, the irradiation corresponding to set irradiation distance information, the processor instructs the projecting unit to perform projection of an image in such a way that a virtual image corresponding to the irradiation distance information is visually recognized by an occupant of the vehicle, and also controls either a projection position or a projection size of the image projected by the projecting unit on a basis of an instruction of the occupant, the processor instructs the irradiating unit to perform irradiation with multiple reference light beams having different irradiation distances, and also instructs the irradiating unit to perform irradiation with one of the reference light beams which is selected on a basis of the occupant's instruction to select one reference light beam from the multiple reference light beams, and the processor instructs the projecting unit to perform the projection of the image in such a way that the virtual image corresponding to the irradiation distance of the selected one of the reference light beams is visually recognized by the occupant.

Advantageous Effects of Invention

According to the present invention, there can be provided a display control device, a display control method, and a calibration system that prevent a position at which a virtual image is visually recognized from deviating by adjusting the position at which the virtual image is visually recognized without using an image of an area in front of a vehicle, the image being captured by a camera.

BRIEF DESCRIPTION OF DRAWINGS

FIG. 6 is a flowchart showing the operation of the display control device according to Embodiment 1;

DESCRIPTION OF EMBODIMENTS

Embodiment 1

Hereafter, in order to explain this invention in greater detail, embodiments of the present invention will be described with reference to the accompanying drawings.

Figure 1:
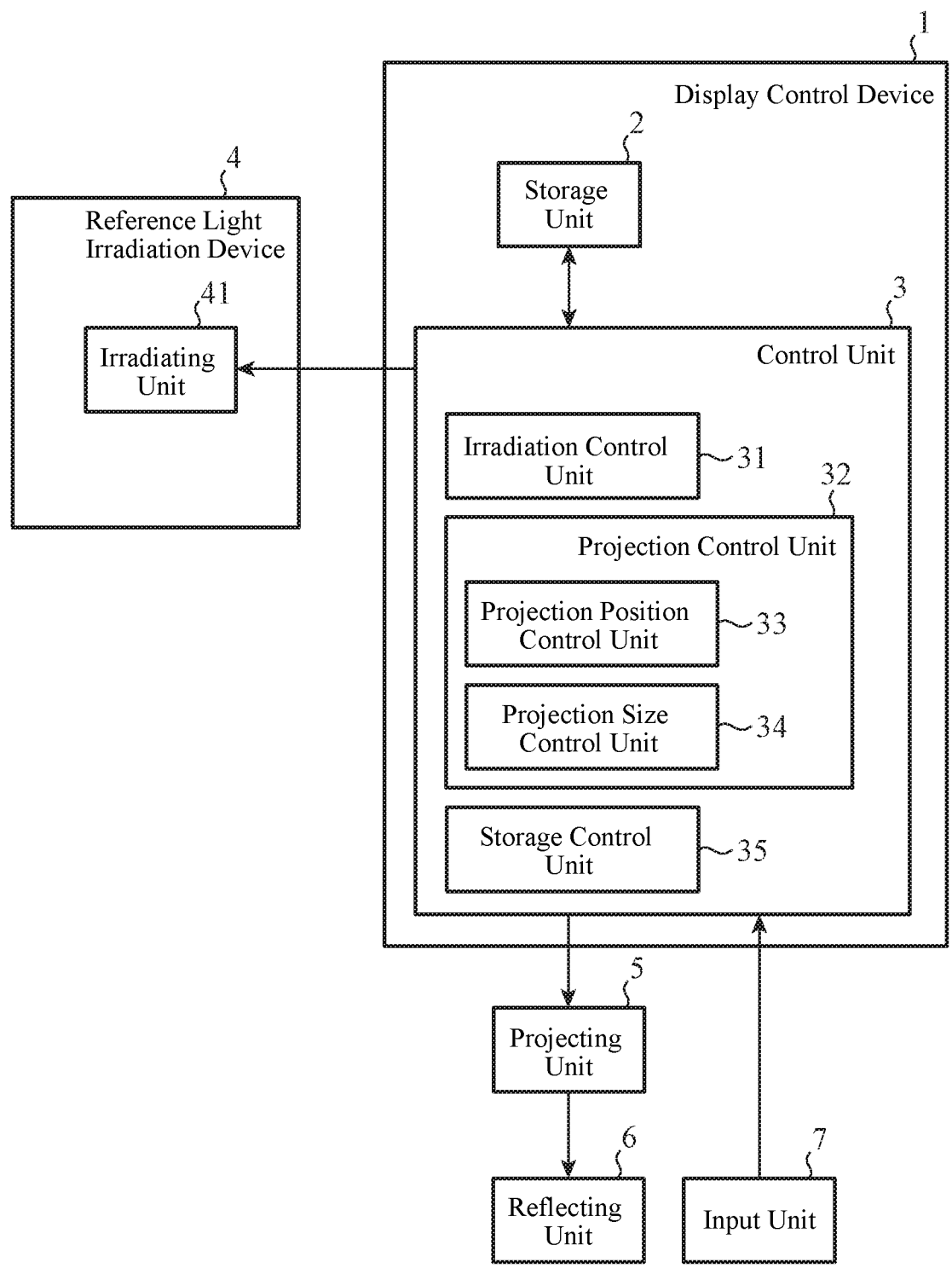
FIG. 1 is a block diagram showing the configuration of a calibration system including a display control device according to Embodiment 1.

FIG. 1 is a block diagram showing the configuration of a calibration system including a display control device 1 according to Embodiment 1. The calibration system includes the display control device 1, a reference light irradiation device 4, a projecting unit 5, a reflecting unit 6, and an input unit 7. The calibration system is mounted in a vehicle 10. The display control device 1 is used for a head up display and the like.

The projecting unit 5 projects an image onto the reflecting unit 6 on the basis of an instruction of the display control device 1. The projecting unit 5 is connected to the display control device 1 via a cable or a wireless connection in such a way that communications can be performed. The projecting unit 5 is, for example, a liquid crystal display. The liquid crystal display is configured to include a liquid crystal panel, a circuit board, a backlight, and the like.

The reflecting unit 6 is, for example, a front window of the vehicle 10, a combiner mounted in the cabin of the vehicle 10, or the like. The reflecting unit 6 reflects the image projected by the projecting unit 5 toward an occupant of the vehicle 10.

Hereafter, a case in which the front window in front of the driver's seat is the reflecting unit 6, and the reflecting unit 6 reflects the image projected by the projecting unit 5 toward the driver of the vehicle 10 will be explained.

The display control device 1 acquires information, such as navigation information, information about the remaining amount of fuel, or information about an abnormality occurring in the vehicle, from not-illustrated vehicle-mounted equipment, a not-illustrated vehicle ECU, or the like. The display control device 1 instructs the projecting unit 5 to project an image including at least a single object onto the reflecting unit 6 on the basis of the information acquired thereby. An object is, for example, an arrow showing a route, an icon showing the remaining amount of fuel, an icon showing an abnormality occurring in the vehicle, or the like. Further, an image which is composed of two objects is, for example, is one which is composed of two arrows showing a route.

Hereafter, a case in which an image including at least a single object is one which constitutes a single arrow showing a route will be explained.

When the image projected by the projecting unit 5 is reflected by the reflecting unit 6 and enters the driver's eyes, a virtual image of the image is visually recognized by the driver through the reflecting unit 6.

Figure 2:
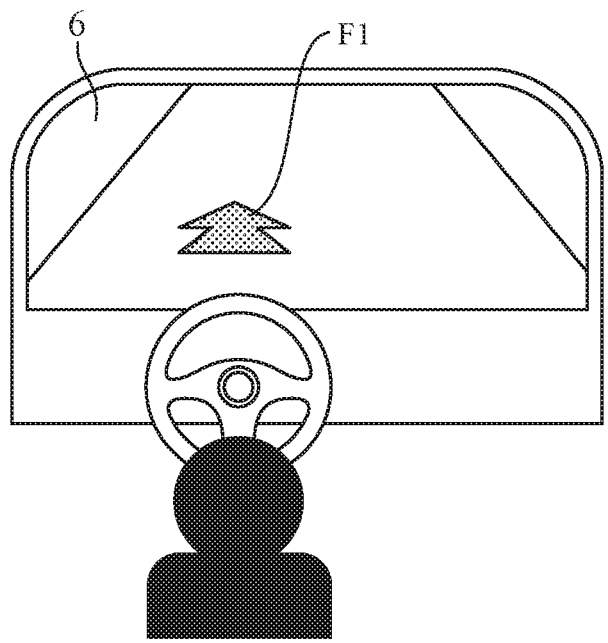
FIG. 2 is a view showing a virtual image visually recognized through a reflecting unit.

FIG. 2 is a view showing a virtual image F1 which the driver visually recognizes through the reflecting unit 6. Hereafter, an adjustment of the position of the virtual image visually recognized through the reflecting unit 6 is referred to as calibration.

The reference light irradiation device 4 irradiates a road surface with beam light (referred to as reference light hereafter) which serves as a reference when the calibration is performed, on the basis of an instruction of the display control device 1. The reference light irradiation device 4 is connected to the display control device 1 via a cable or a wireless connection in such a way that communications can be performed. The reference light irradiation device 4 includes an irradiating unit 41 that irradiates a road surface with the reference light. The irradiating unit 41 includes a laser diode, an LED (Light Emitting Diode), or the like, and is mounted on, for example, the roof of the vehicle 10.

As the reference light, light displayed, as a single point, a single line, a single graphic, or the like, on a road surface is provided. Hereafter, a case in which the reference light is displayed as a single line on a road surface will be explained.

The reference light irradiation device 4 irradiates an area at a position which is apart by an irradiation distance indicated by the display control device 1 from a predetermined point of the vehicle 10 with the reference light. Hereafter, as the predetermined point of the vehicle 10, a point corresponding to the position of the driver's eye in the vehicle 10 is defined.

The input unit 7 is a device that enables input of information. The input unit 7 is, for example, switches. The input unit 7 is connected to the display control device 1 via a cable or a wireless connection in such a way that communications can be performed.

The input unit 7 includes a switch (referred to as a first switch hereafter) for switching to a calibration mode. Further, the input unit 7 includes a switch (referred to as a second switch hereafter) for adjusting the position of the virtual image. Further, the input unit 7 includes a switch (referred to as a third switch hereafter) for adjusting the size of the virtual image. Further, the input unit 7 includes a switch (referred to as a fourth switch hereafter) for deciding the position or the size of the virtual image. The first to fourth switches can be constituted by a touch panel that enables input of information.

The display control device 1 includes a storage unit 2 and a control unit 3.

The control unit 3 includes an irradiation control unit 31, a projection control unit 32, a projection position control unit 33, a projection size control unit 34, and a storage control unit 35.

Figure 3:
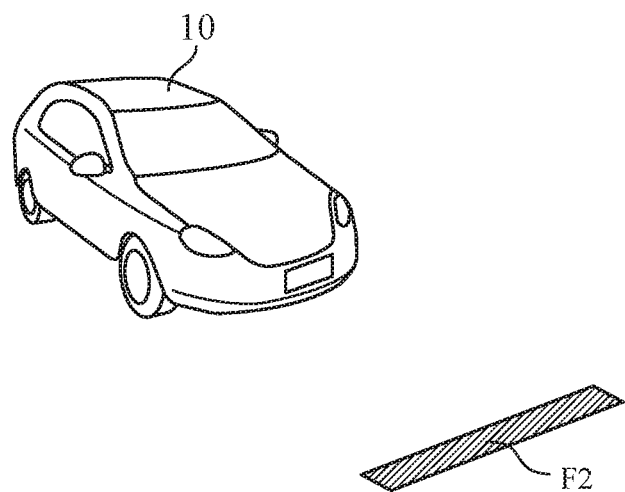
FIG. 3 is a view showing the irradiation with reference light.

The irradiation control unit 31 controls the irradiation of a road surface with the reference light, the irradiation being performed by the irradiating unit 41. The irradiation control unit 31 acquires operation information about the first switch. When acquiring the operation information about the first switch, the irradiation control unit 31 instructs the irradiating unit 41 to perform the irradiation with the reference light, the irradiation corresponding to irradiation distance information. Hereafter, it is assumed that the irradiation distance information is set in advance. However, the irradiation distance information can be set via, for example, the input unit 7. Hereafter, the irradiation distance information is assumed to be 30 [m]. FIG. 3 is a view showing an example of the irradiation with a reference light F2, the irradiation being performed by the irradiating unit 41.

The projection control unit 32 controls the projection of an image, the projection being performed by the projecting unit 5. The projection control unit 32 acquires the operation information about the first switch. When acquiring the operation information about the first switch, the projection control unit 32 instructs the projecting unit 5 to perform the projection of an image in such a way that a virtual image corresponding to the irradiation distance information is visually recognized by the driver.

The projection control unit 32 includes a projection position control unit 33 and a projection size control unit 34.

When acquiring the operation information about the first switch, the projection position control unit 33 indicates the projection position of the image projected onto the reflecting unit 6 to the projecting unit 5. The image projection position is one which causes a virtual image to be visually recognized at a position apart by the same distance as the irradiation distance of the reference light from the predetermined point of the vehicle 10.

When acquiring the operation information about the first switch, the projection size control unit 34 indicates the projection size of the image projected onto the reflecting unit 6 to the projecting unit 5. The image projection size is one which causes a virtual image having a size set to be suited to the irradiation distance of the reference light to be visually recognized.

The projection position control unit 33 acquires operation information about the second switch. When acquiring the operation information about the second switch, the projection position control unit 33 instructs the projecting unit 5 to make a change to the image projection position on the basis of the operation information.

The projection size control unit 34 acquires operation information about the third switch. When acquiring the operation information about the third switch, the projection size control unit 34 instructs the projecting unit 5 to make a change to the image projection size on the basis of the operation information.

The storage control unit 35 acquires operation information about the fourth switch. When acquiring the operation information about the fourth switch, the storage control unit 35 stores either the image projection position which the projection position control unit 33 indicates to the projecting unit 5, or the projection size which the projection size control unit 34 indicates to the projecting unit 5 in the storage unit 2. When the projection position control unit 33 provides an instruction to change the image projection position and the projection size control unit 34 provides an instruction to change the image projection size, and the storage control unit 35 then acquires the operation information about the fourth switch, the storage control unit stores both the image projection position which the projection position control unit 33 indicates to the projecting unit 5, and the projection size which the projection size control unit 34 indicates to the projecting unit 5 in the storage unit 2.

The storage unit 2 stores either the image projection position which the projection position control unit 33 indicates to the projecting unit 5, or the projection size which the projection size control unit 34 indicates to the projecting unit 5. Although it is assumed hereafter that the storage unit 2 is an HDD (Hard Disk Drive) mounted in the display control device 1, the storage unit 2 can be alternatively a USB memory or the like disposed separately from the display control device 1.

When the storage control unit 35 stores either the image projection position which the projection position control unit 33 indicates to the projecting unit 5, or the projection size which the projection size control unit 34 indicates to the projecting unit 5 in the storage unit 2, the calibration mode is ended.

Hereafter, a default value of an image projection position Y1 which the projection position control unit 33 indicates to the projecting unit 5 will be explained.

Figure 4A:
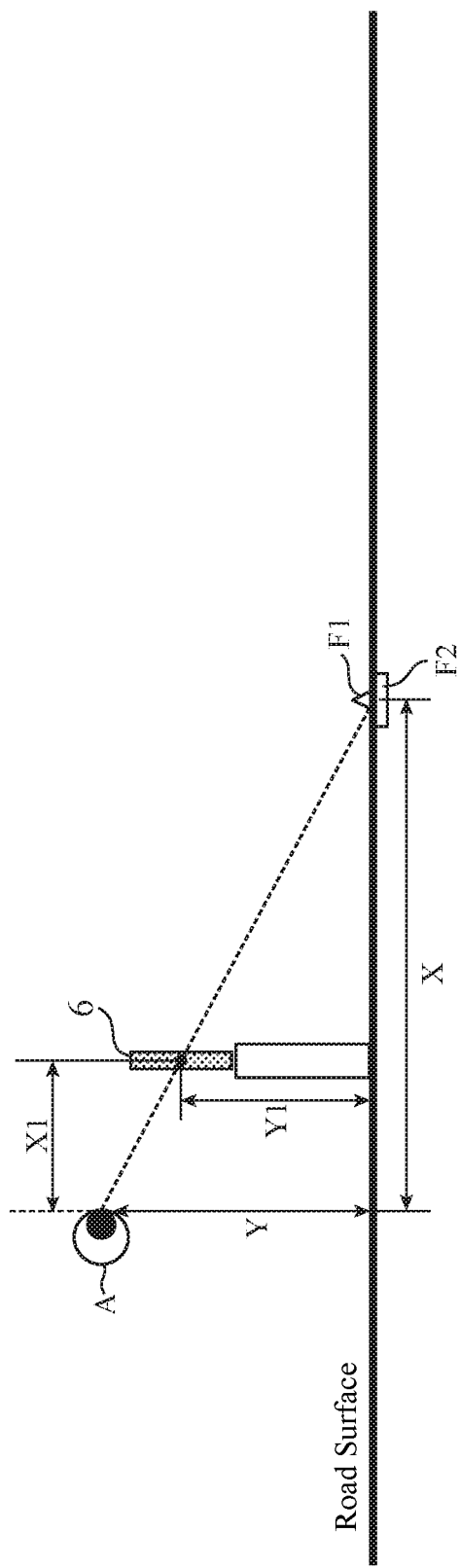
FIG. 4A is a view showing a situation in which a driver visually recognizes the virtual image and the reference light.

FIG. 4A is a view showing a situation in which a driver A visually recognizes the virtual image F1 and the reference light F2. In FIG. 4A, the virtual image F1 is visually recognized at the same position as the irradiation position of the reference light F2. The default value of the image projection position Y1 is set in a state shown in FIG. 4A.

As shown in FIG. 4A, the image projection position Y1 is the height from the road surface to the position of the image projected onto the reflecting unit 6. When the height from the road surface to the position of an eye of the driver sitting in the driver's seat is expressed by Y [cm], the straight-line distance from the position of the driver's eye to the position at which the virtual image is visually recognized is expressed by X [m], and the straight-line distance from the position of the driver's eye to the position of the image projected onto the reflecting unit 6 is expressed by X1 [m], the image projection position Y1 [cm] can be acquired using the following equation (1).

$$Y1 = Y \times (X - X1)/X \qquad (1)$$

In FIG. 4A, it is assumed that X is 30 [m] and X1 is 3 [m]. Further, it is assumed that the value of Y of the driver A is 136 [cm]. By substituting these values into the equation (1), Y1=122.4 [cm] is calculated.

At this time, information showing that the image projection position Y1 is 122.4 [cm] when X is 30 [m] is stored as the default value in the storage unit 2.

The projection position control unit 33 indicates the image projection position Y1 to the projecting unit 5 on the basis of the default value. When, for example, the driver is caused to visually recognize the virtual image at a position at which X has a value such as 10 [m] or 50 [m], the projection position control unit 33 acquires the image projection position Y1 by using the equation (1).

Next, a default value of the image projection size S1 which the projection size control unit 34 indicates to the projecting unit 5 will be explained.

Figure 4B:
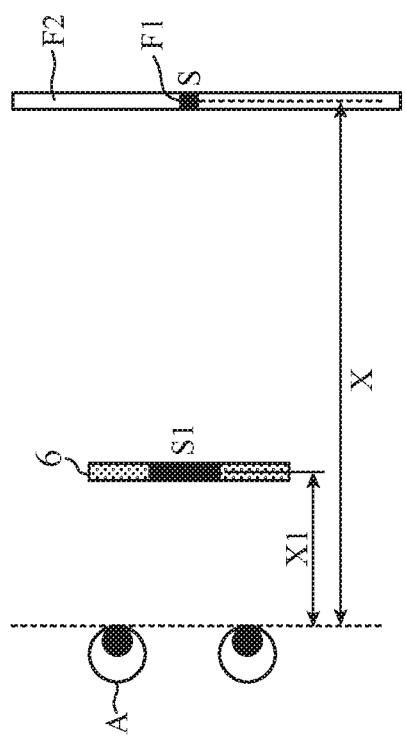
FIG. 4B is another view showing the situation in which the driver visually recognizes the virtual image and the reference light.

FIG. 4B is another view showing the situation in which the driver A visually recognizes the virtual image F1 and the reference light F2. In FIG. 4B, the virtual image F1 is visually recognized at the same position as the irradiation position of the reference light F2. The default value of the image projection size S1 is set in a state shown in FIG. 4B.

As shown in FIG. 4B, the image projection size S1 is the size of the image projected onto the reflecting unit 6. When the size of the virtual image at the position at which the virtual image is visually recognized is expressed by S [cm$^2$], the straight-line distance from the position of the driver's eye to the position at which the virtual image is visually recognized is expressed by X [m], and the straight-line distance from the position of the driver's eye to the position of the image projected onto the reflecting unit 6 is expressed by X1 [m], the image projection size S1 [cm$^2$] can be acquired using the following equation (2).

$$S1 = S \times X/X1 \qquad (2)$$

In FIG. 4B, it is assumed that X is 30 [m] and X1 is 3 [m]. Further, it is assumed that the value of S is 1 [cm$^2$]. By substituting these values into the equation (2), S1=10 [cm$^2$] is calculated.

At this time, information showing that the image projection size S1 is set to 10 [cm$^2$] when X is 30 [m] is stored as the default value in the storage unit 2.

The projection size control unit 34 indicates the image projection size S1 to the projecting unit 5 on the basis of the default value. When, for example, the driver is caused to visually recognize the virtual image at a position at which X has a value such as 10 [m] or 50 [m], the projection size control unit 34 acquires the image projection size S1 by using the equation (2).

Next, examples of the hardware configuration of the control unit 3 will be explained.

Figure 5A:
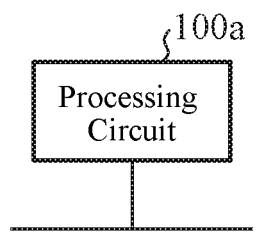
FIGS. 5A and 5B are views showing examples of the hardware configuration of the display control device.
Figure 5B:
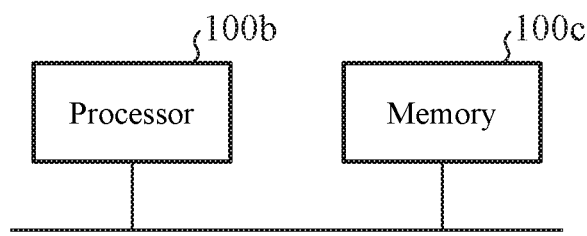

FIGS. 5A and 5B are views showing examples of the hardware configuration of the control unit 3 according to Embodiment 1.

The irradiation control unit 31, the projection control unit 32, the projection position control unit 33, the projection size control unit 34, and the storage control unit 35 in the control unit 3 can be a processing circuit 100a which is hardware for exclusive use, as shown in FIG. 5A, or can be a processor 100b that executes a program stored in a memory 100c, as shown in FIG. 5B.

In the case in which the irradiation control unit 31, the projection control unit 32, the projection position control unit 33, the projection size control unit 34, and the storage control unit 35 are hardware for exclusive use, as shown in FIG. 5A, the processing circuit 100a is, for example, a single circuit, a composite circuit, a programmable processor, a parallel programmable processor, an ASIC (Application Specific Integrated Circuit), an FPGA (Field-programmable Gate Array), or a combination of these circuits. The function of each of the following units: the irradiation control unit 31, the projection control unit 32, the projection position control unit 33, the projection size control unit 34, and the storage control unit 35 can be implemented by a processing circuit, or the functions of the units can be implemented collectively by a single processing circuit.

In the case in which the irradiation control unit 31, the projection control unit 32, the projection position control unit 33, the projection size control unit 34, and the storage control unit 35 are the processor 100b, as shown in FIG. 5B, the function of each of the units is implemented by software, firmware, or a combination of software and firmware. The software or the firmware is described as a program and the program is stored in the memory 100c. The processor 100b implements each of the functions of the irradiation control unit 31, the projection control unit 32, the projection position control unit 33, the projection size control unit 34, and the storage control unit 35 by reading and executing the program stored in the memory 100c. More specifically, the irradiation control unit 31, the projection control unit 32, the projection position control unit 33, the projection size control unit 34, and the storage control unit 35 include the memory 100c for storing the programs in which steps shown in FIG. 6 mentioned later are performed as a result when the program is executed by the processor 100b. Further, it can be said that these programs cause a computer to execute procedures or methods which the irradiation control unit 31, the projection control unit 32, the projection position control unit 33, the projection size control unit 34, and the storage control unit 35 use.

Here, the processor 100b is, for example, a CPU (Central Processing Unit), a processing device, an arithmetic device, a processor, a microprocessor, a microcomputer, a DSP (Digital Signal Processor), or the like.

The memory 100c is, for example, a non-volatile or volatile semiconductor memory such as a RAM (Random Access Memory), a ROM (Read Only Memory), a flash memory, an EPROM (Erasable Programmable ROM), or an EEPROM (Electrically EPROM), a magnetic disk such as a hard disk or a flexible disk, or an optical disc such as a mini disc, a CD (Compact Disc), or a DVD (Digital Versatile Disc).

Some of the functions of the irradiation control unit 31, the projection control unit 32, the projection position control unit 33, the projection size control unit 34, and the storage control unit 35 can be implemented by hardware for exclusive use, and some of the functions can be implemented by software or firmware. In this way, in the processing circuit 100a in the control unit 3, each of the above-mentioned functions can be implemented by hardware, software, firmware, or a combination of hardware, software, and firmware.

Next, operations will be explained.

FIG. 6 is a flowchart showing the operation of the display control device 1 according to Embodiment 1.

The control unit 3 determines whether or not the operation information about the first switch is acquired (step ST11).

When the control unit 3, in step ST11, determines that the operation information about the first switch is acquired (YES in step ST11), the irradiation control unit 31 instructs the irradiating unit 41 to perform the irradiation with the reference light, the irradiation corresponding to the irradiation distance information (step ST12).

In contrast, when the control unit 3, in step ST11, determines that the operation information about the first switch is not acquired (NO in step ST11), the processing is ended.

Next, the projection control unit 32 instructs the projecting unit 5 to perform the projection of an image in such a way that a virtual image corresponding to the irradiation distance information is visually recognized by the driver (step ST13).

Next, the projection control unit 32 determines whether or not the operation information about either the second switch or the third switch is acquired (step ST14).

When, in step ST14, determining that the operation information about either the second switch or the third switch is acquired (YES in step ST14), the projection control unit 32 instructs the projecting unit 5 to make a change to either the image projection position or the image projection size on the basis of the operation information about either the second switch or the third switch (step ST15).

In contrast, when the projection control unit 32, in step ST14, determines that the operation information about either the second switch or the third switch is not acquired (NO in step ST14), the processing advances to step ST16. This is because there is a case in which although the device is set to the calibration mode, it is not necessary to perform the calibration and the fourth switch is operated.

Next, the storage control unit 35 determines whether or not the operation information about the fourth switch is acquired (step ST16).

When, in step ST16, determining that the operation information about the fourth switch is acquired (YES in step ST16), the storage control unit 35 stores either the image projection position or the image projection size which the projection control unit 32 indicates to the projecting unit 5 in the storage unit 2 (step ST17). In contrast, when the storage control unit 35, in step ST16, determines that the operation information about the fourth switch is not acquired (NO in step ST16), the processing returns to step ST14.

Hereafter, a case in which a driver B different from the driver A gets in the vehicle and sits in the driver's seat, and the driver B performs the calibration of the image projection position Y1 shown in FIG. 4A will be explained. The value of Y shown in FIG. 4A differs between the driver A and the driver B.

Figure 7A:
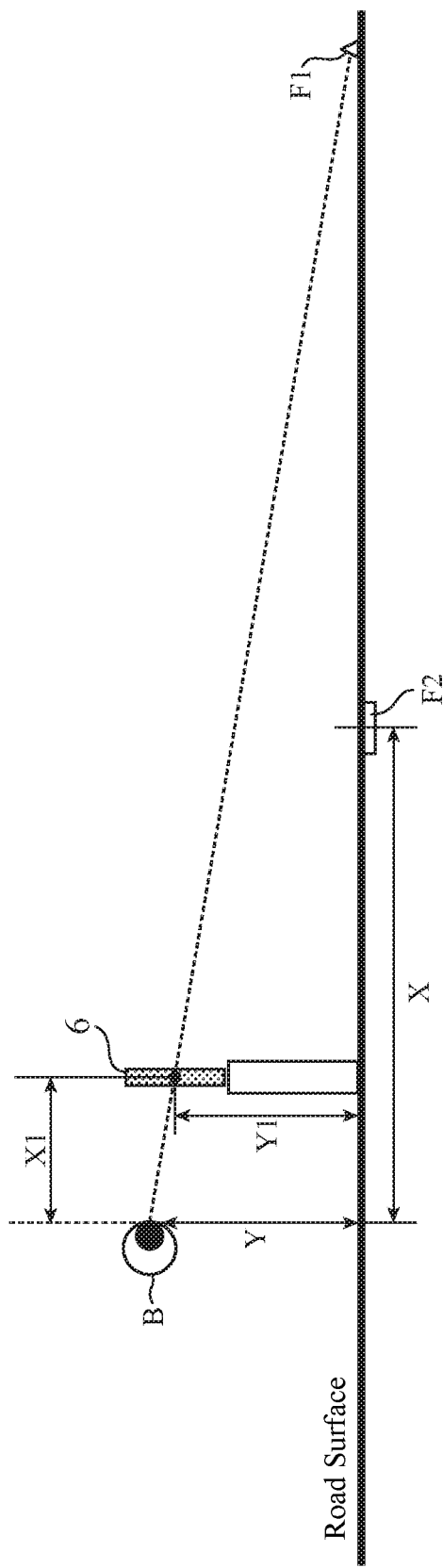
FIG. 7A is a view showing a situation in which a driver visually recognizes the virtual image and the reference light.

FIG. 7A is a view showing a situation in which the driver B visually recognizes the virtual image F1 and the reference light F2. FIG. 7A shows a situation in which the driver B operates the first switch, and, at that time, the driver B visually recognizes deviation in position between the irradiation with the reference light F2 and the virtual image F1.

Figure 7B:
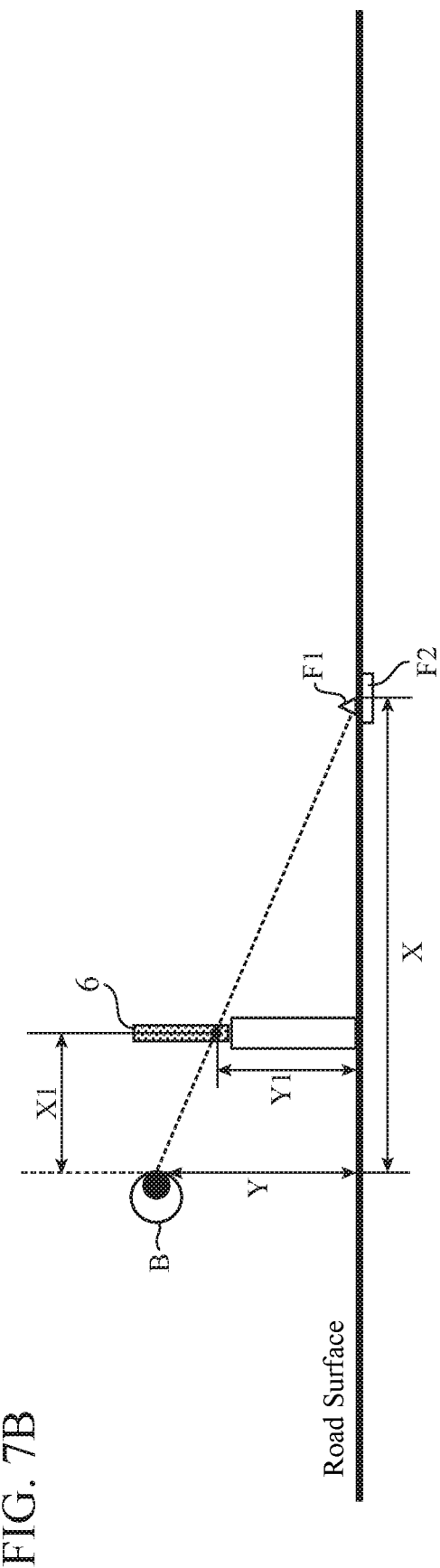
FIG. 7B is a view showing a situation in which the projection position of an image is changed.

The driver B aligns the position at which the virtual image F1 is visually recognized to the position of the irradiation with the reference light F2 by using the second switch. At this time, the projection position control unit 33 instructs the projecting unit 5 to make a change to the image projection position on the basis of the operation information about the second switch. FIG. 7B is a view showing a situation in which the image projection position Y1 is changed in accordance with an instruction of the projection position control unit 33. In FIG. 7B, the projection position control unit 33 instructs the projecting unit 5 to change the image projection position Y1 from 122.4 [cm] which is the default value to 120 [cm].

Here, when the driver B who has changed the image projection position Y1 does not perform the calibration of the image projection size S1, but operates the fourth switch, the storage control unit 35 stores information showing that the image projection position Y1 is 120 [cm] when X is 30 [m] in the storage unit 2.

At this time, a configuration can be provided in which the projection position control unit 33 calculates the value of Y of the driver B by using the equation (1), and the storage control unit 35 stores the value of Y in the storage unit 2. The value of Y of the driver B is 133.3 [cm].

Further, the storage control unit 35 can be configured to generate information (referred to as occupant information hereafter) making it possible to identify the driver B on the basis of data acquired from a not-illustrated occupant detecting device, and store the occupant information in the storage unit 2. The occupant detecting device is a camera or the like mounted in the vehicle 10, for capturing an image of an occupant of the vehicle 10.

Next, a case in which the driver B performs the calibration of the image projection size S1 will be explained. Hereafter, a case in which the driver B increases the size of the virtual image F1 which he or she visually recognizes at the position of the irradiation with the reference light F2 in a state shown in FIG. 7B will be explained.

The driver B increases the size of the virtual image F1 which he or she visually recognizes at the position of the irradiation with the reference light F2 by using the third switch. The projection size control unit 34 instructs the projecting unit 5 to make a change to the image projection size on the basis of the operation information about the third switch. Here, it is assumed that the projection size control unit 34 instructs the projecting unit 5 to change the image projection size S1 from 10 [cm$^2$] which is the default value to 15 [cm$^2$].

When the driver B operates the fourth switch, the storage control unit 35 stores information showing that the image projection size S1 is 15 [cm$^2$] when X is 30 [m] in the storage unit 2.

As mentioned above, the display control device 1 of Embodiment 1 is mounted in the vehicle 10, and includes the irradiation control unit 31 for controlling the irradiating unit 41 that irradiates a road surface with the reference light, and the projection control unit 32 for controlling the projecting unit 5 that projects an image onto the reflecting unit 6 that reflects the image. The irradiation control unit 31 instructs the irradiating unit 41 to perform the irradiation with the reference light, the irradiation corresponding to the set irradiation distance information, and the projection control unit 32 instructs the projecting unit 5 to perform the projection of an image in such a way that a virtual image corresponding to the irradiation distance information is visually recognized by an occupant of the vehicle and also controls either the projection position or the projection size of the image projected by the projecting unit 5 on the basis of an instruction of the occupant. As a result, the display control device that prevents the position at which the virtual image is visually recognized from deviating by adjusting the position at which the virtual image is visually recognized without using an image of an area in front of the vehicle, the image being captured by a camera, can be provided.

Although in Embodiment 1, the case in which the irradiation distance of the reference light is set to 30 [m] and the calibration is performed once is explained, the irradiation distance of the reference light can be changed and the calibration can be performed multiple times. The display control device 1 further includes the storage control unit 35 for storing either the image projection position or the image projection size in the storage unit 2 on the basis of the occupant's instruction to decide either the image projection position or the image projection size. The storage control unit 35 stores either the image projection position or the image projection size which is adjusted in accordance with the reference light at a single irradiation distance or each of multiple different irradiation distances in the storage unit 2, and the projection control unit 32 acquires either the image projection position or the image projection size at a position apart by a freely selected distance from the vehicle 10, on the basis of either the image projection position or the image projection size stored in the storage unit 2. As a result, for example, by performing the calibration at a position 30 [m] apart from the vehicle 10, even when the driver is caused to visually recognize the virtual image at a position apart at a distance of 10 [m], 50 [m], or the like from the vehicle 10, the deviation between each of those positions and the position at which the virtual image is visually recognized can be prevented.

In the above explanation, the case in which the projection control unit 32 instructs the projecting unit 5 to perform the projection of an image which is made up of a single arrow showing a route is explained. For example, a configuration is provided in which the projection control unit 32 instructs the projecting unit 5 to perform the projection of an image which is composed of two arrows showing a route, and, when two virtual images are visually recognized through the reflecting unit 6, a virtual image on which the calibration is to be performed can be selected via the input unit 7.

Embodiment 2

Because the configuration of a calibration system including a display control device 1 according to Embodiment 2 is the same as that shown in FIG. 1, an illustration of a block diagram is omitted.

Further, an explanation of components having the same functions as those of the components explained in Embodiment 1 or like functions will be omitted or simplified.

Figure 8:
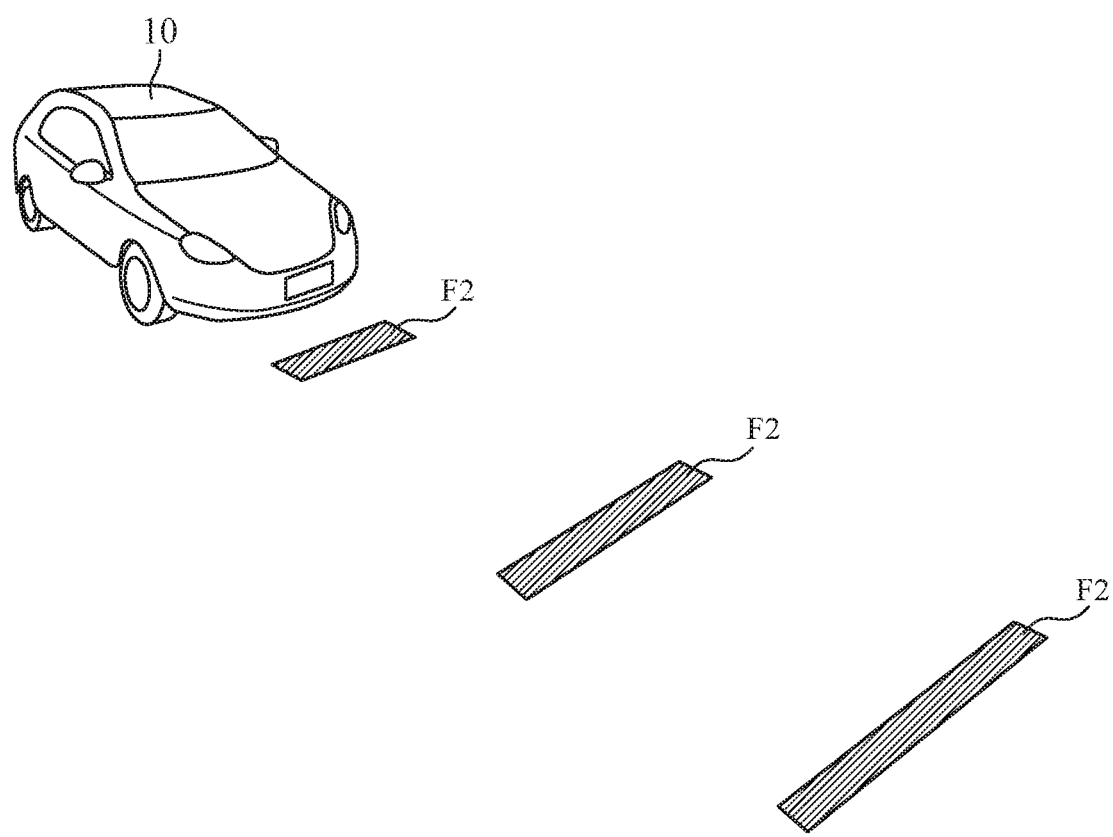
FIG. 8 is a view showing the irradiation with reference light.

When acquiring operation information about a first switch, an irradiation control unit 31 instructs an irradiating unit 41 to perform the irradiation with multiple reference light beams having different irradiation distances in accordance with pieces of irradiation distance information. Hereafter, it is assumed that the irradiation control unit 31 instructs the irradiating unit 41 to perform the irradiation with three reference light beams having different irradiation distances. It is assumed that the pieces of irradiation distance information are 10 [m], 30 [m], and 50 [m]. FIG. 8 is a view showing an example of the irradiation with the reference light beams F2 which is performed by the irradiating unit 41.

An input unit 7 further includes a switch (referred to as a fifth switch hereafter) for selecting one reference light beam from the multiple reference light beams. The fifth switch can be a touch panel that enables input of information.

The irradiation control unit 31 acquires operation information about the fifth switch. When acquiring the operation information about the fifth switch, the irradiation control unit 31 instructs the irradiating unit 41 to perform the irradiation with the selected reference light beam on the basis of the operation information about the fifth switch.

A projection control unit 32 acquires the operation information about the fifth switch. When acquiring the operation information about the fifth switch, the projection control unit 32 instructs a projecting unit 5 to perform the projection of an image in such a way that a virtual image corresponding to the irradiation distance of the selected reference light beam is visually recognized by the driver.

Next, operations will be explained.

Figure 9:
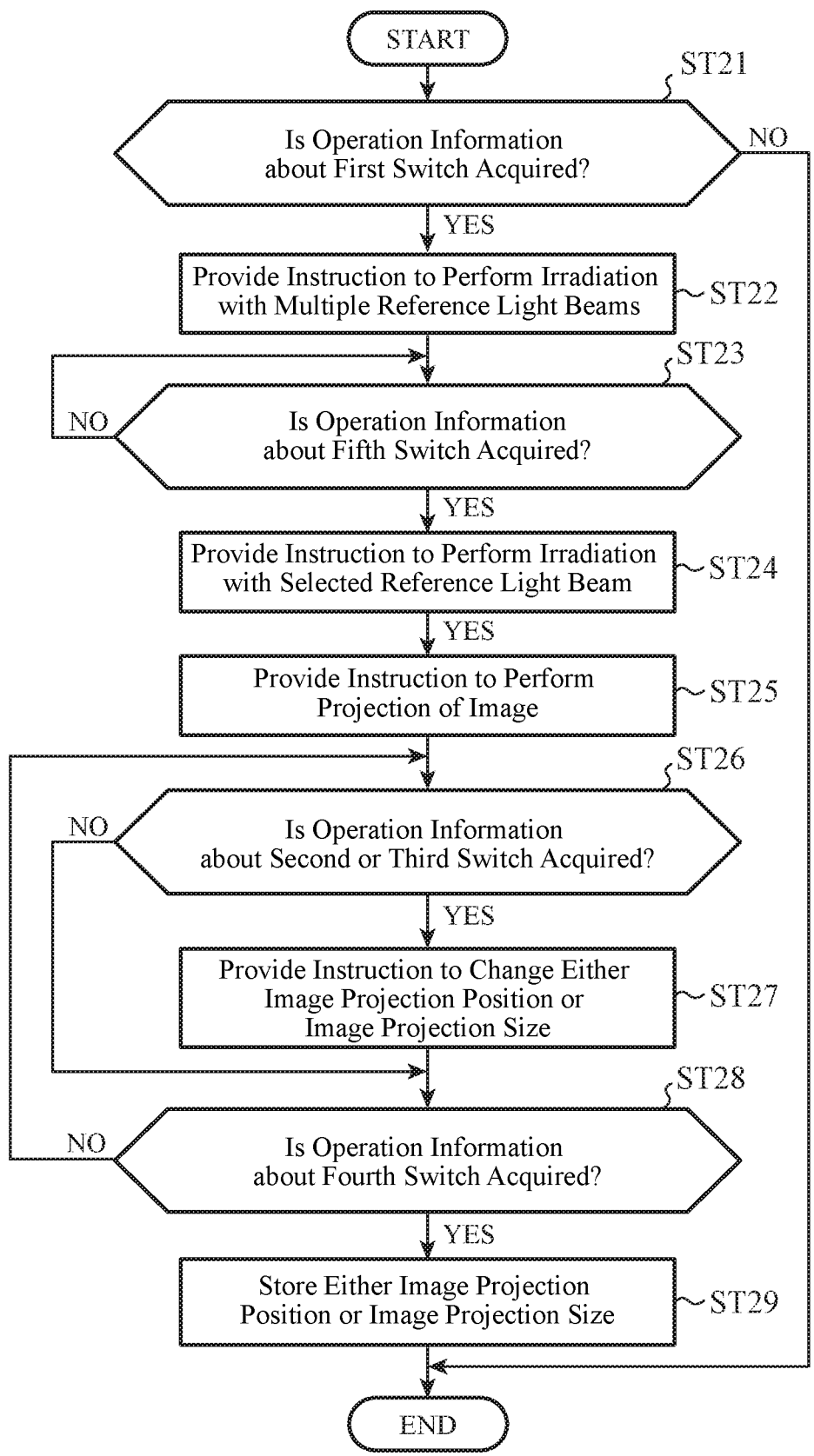
FIG. 9 is a flowchart showing the operation of a display control device according to Embodiment 2.

FIG. 9 is a flowchart showing the operation of the display control device 1 according to Embodiment 2.

The irradiation control unit 31 determines whether or not operation information about the first switch is acquired (step ST21).

When, in step ST21, determining that the operation information about the first switch is acquired (YES in step ST21), the irradiation control unit 31 instructs the irradiating unit 41 to perform the irradiation with the multiple reference light beams having the different irradiation distances (step ST22).

In contrast, when the irradiation control unit 31, in step ST21, determines that the operation information about the first switch is not acquired (NO in step ST21), the processing is ended.

Next, the irradiation control unit 31 determines whether or not the operation information about the fifth switch is acquired (step ST23).

When, in step ST23, determining that the operation information about the fifth switch is acquired (YES in step ST23), the irradiation control unit 31 instructs the irradiating unit 41 to perform the irradiation with the selected reference light beam on the basis of the operation information about the fifth switch (step ST24).

In contrast, when the irradiation control unit 31, in step ST23, determines that the operation information about the fifth switch is not acquired (NO in step ST23), the process of step ST23 is repeated.

Next, the projection control unit 32 instructs the projecting unit 5 to perform the projection of an image in such a way that a virtual image corresponding to the irradiation distance of the selected reference light beam is visually recognized by the driver (step ST25).

Next, the projection control unit 32 determines whether or not operation information about either a second switch or a third switch is acquired (step ST26).

When, in step ST26, determining that the operation information about either the second switch or the third switch is acquired (YES in step ST26), the projection control unit 32 instructs the projecting unit 5 to make a change to either the projection position or the projection size of the image on the basis of the operation information about either the second switch or the third switch (step ST27).

In contrast, when the projection control unit 32, in step ST26, determines that the operation information about either the second switch or the third switch is not acquired (NO in step ST26), the processing advances to step ST28.

Next, a storage control unit 35 determines whether or not operation information about a fourth switch is acquired (step ST28).

When, in step ST28, determining that the operation information about the fourth switch is acquired (YES in step ST28), the storage control unit 35 stores either the image projection position or the image projection size which the projection control unit 32 indicates to the projecting unit 5 in a storage unit 2 (step ST29). In contrast, when the storage control unit 35, in step ST28, determines that the operation information about the fourth switch is not acquired (NO in step ST28), the processing returns to step ST26.

As mentioned above, according to this Embodiment 2, the irradiation control unit 31 instructs the irradiating unit 41 to perform the irradiation with the multiple reference light beams having the different irradiation distances, and also instructs the irradiating unit 41 to perform the irradiation with a selected one of the reference light beams on the basis of an occupant's instruction to select one reference light beam from the multiple reference light beams, and the projection control unit 32 instructs the projecting unit to perform the projection of an image in such a way that a virtual image corresponding to the irradiation distance of the selected one of the reference light beams is visually recognized by the occupant. As a result, a position at which calibration is performed can be selected from multiple candidates, and more flexible calibration can be implemented.

Embodiment 3

Because the configuration of a calibration system including a display control device 1 according to Embodiment 3 is the same as that shown in FIG. 1, an illustration of a block diagram is omitted.

Further, an explanation of components having the same functions as those of the components explained in Embodiments 1 and 2 or like functions will be omitted or simplified.

When acquiring operation information about a first switch, an irradiation control unit 31 instructs an irradiating unit 41 to perform the irradiation with multiple reference light beams having different irradiation distances, like that of Embodiment 2. Further, an input unit 7 includes a fifth switch, like that of Embodiment 2.

Further, the irradiation control unit 31 acquires operation information about the fifth switch, like that of Embodiment 2. When acquiring the operation information about the fifth switch, the irradiation control unit 31 instructs the irradiating unit 41 to perform the irradiation with a selected reference light beam on the basis of the operation information about the fifth switch.

A projection control unit 32 acquires the operation information about the fifth switch. When acquiring the operation information about the fifth switch, the projection control unit 32 instructs a projecting unit 5 to perform the projection of an image in such a way that a virtual image corresponding to the irradiation distance of the selected reference light beam is visually recognized by the driver.

When acquiring operation information about a fourth switch, a storage control unit 35 stores either an image projection position or an image projection size which the projection control unit 32 indicates to the projecting unit 5 in a storage unit 2, and also determines whether or not the number of times that the operation information about the fourth switch has been acquired is equal to or greater than a threshold. The threshold can be set to any value via, for example, the input unit 7 or the like.

When the number of times that the operation information about the fourth switch has been acquired is equal to or greater than the threshold, the storage control unit 35 ends a calibration mode.

When the number of times that the operation information about the fourth switch has been acquired is less than the threshold, the storage control unit 35 outputs information indicating that the calibration mode is to be set to the irradiation control unit 31. When acquiring the information indicating that the calibration mode is to be set from the storage control unit 35, the irradiation control unit 31 instructs the irradiating unit 41 to perform the irradiation with the multiple reference light beams having the different irradiation distances. At this time, the irradiation control unit 31 can be configured so as not to provide an instruction to perform irradiation as to any reference light beam which has been selected by the fifth switch.

Next, operations will be explained.

Figure 10:
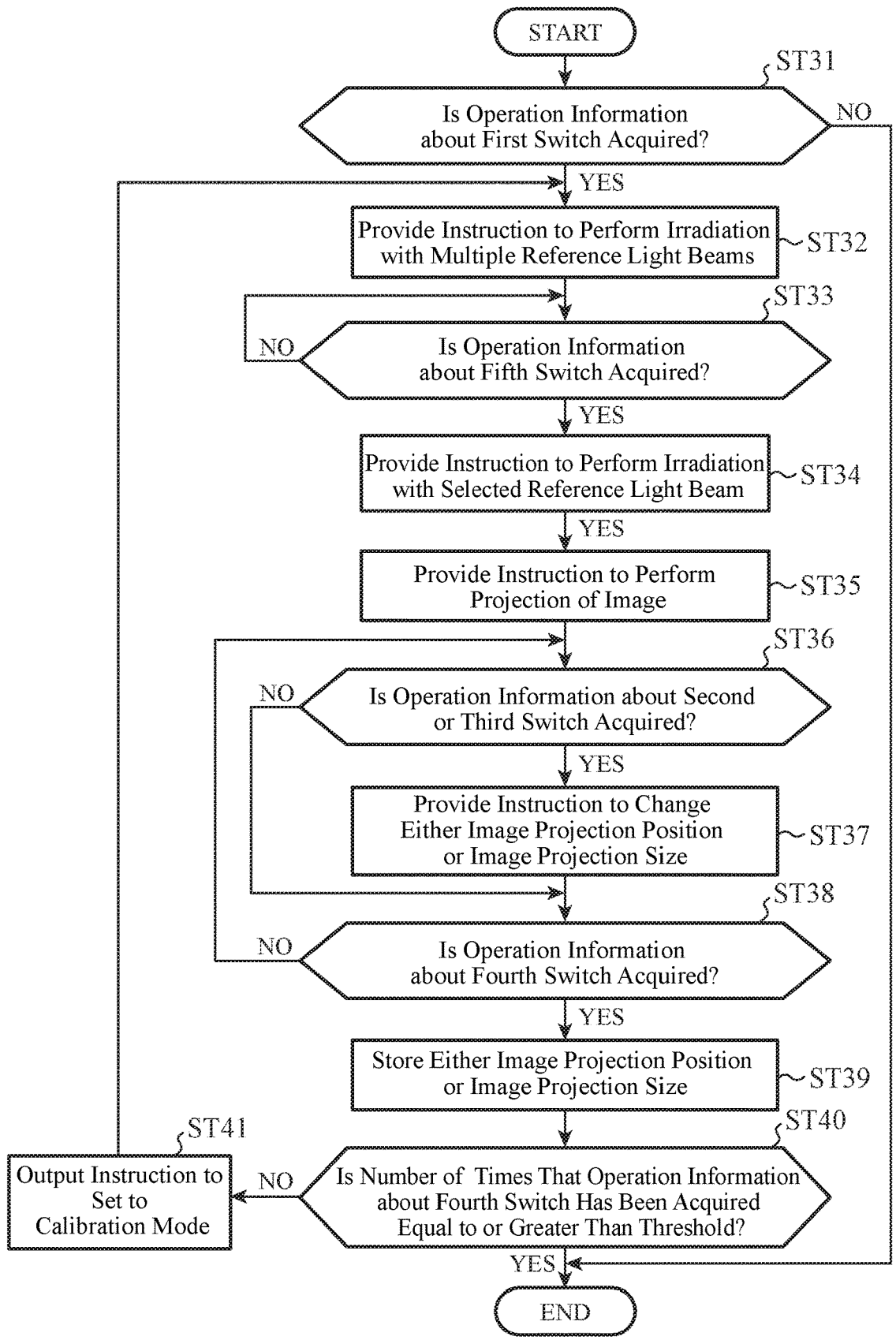
FIG. 10 is a flowchart showing the operation of a display control device according to Embodiment 3.

FIG. 10 is a flowchart showing the operation of the display control device 1 according to Embodiment 3.

The irradiation control unit 31 determines whether or not the operation information about the first switch is acquired (step ST31).

When, in step ST31, determining that the operation information about the first switch is acquired (YES in step ST31), the irradiation control unit 31 instructs the irradiating unit 41 to perform the irradiation with the multiple reference light beams having the different irradiation distances (step ST32).

In contrast, when the irradiation control unit 31, in step ST31, determines that the operation information about the first switch is not acquired (NO in step ST31), the processing is ended.

Next, the irradiation control unit 31 determines whether or not the operation information about the fifth switch is acquired (step ST33).

When, in step ST33, determining that the operation information about the fifth switch is acquired (YES in step ST33), the irradiation control unit 31 instructs the irradiating unit 41 to perform the irradiation with the selected reference light beam on the basis of the operation information about the fifth switch (step ST34).

In contrast, when the irradiation control unit 31, in step ST33, determines that the operation information about the fifth switch is not acquired (NO in step ST33), the process of step ST33 is repeated.

Next, the projection control unit 32 instructs the projecting unit 5 to perform the projection of an image in such a way that a virtual image corresponding to the irradiation distance of the selected reference light beam is visually recognized by the driver (step ST35).

Next, the projection control unit 32 determines whether or not operation information about either a second switch or a third switch is acquired (step ST36).

When, in step ST36, determining that the operation information about either the second switch or the third switch is acquired (YES in step ST36), the projection control unit 32 instructs the projecting unit 5 to make a change to either the projection position or the projection size of the image on the basis of the operation information about either the second switch or the third switch (step ST37).

In contrast, when the projection control unit 32, in step ST36, determines that the operation information about either the second switch or the third switch is not acquired (NO in step ST36), the processing advances to step ST38.

Next, the storage control unit 35 determines whether or not the operation information about the fourth switch is acquired (step ST38).

When, in step ST38, determining that the operation information about the fourth switch is acquired (YES in step ST38), the storage control unit 35 stores either the image projection position or the image projection size which the projection control unit 32 indicates to the projecting unit 5 in the storage unit 2 (step ST39).

In contrast, when the storage control unit 35, in step ST38, determines that the operation information about the fourth switch is not acquired (NO in step ST38), the processing returns to step ST36.

Next, the storage control unit 35 determines whether or not the number of times that the operation information about the fourth switch has been acquired is equal to or greater than the threshold (step ST40).

When the storage control unit 35, in step ST40, determines that the number of times that the operation information about the fourth switch has been acquired is equal to or greater than the threshold (YES in step ST38), the calibration mode is ended.

In contrast, when, in step ST40, determining with the number of times that the operation information about the fourth switch has been acquired is less than the threshold (NO in step ST40), the storage control unit 35 outputs an instruction to set to the calibration mode to the irradiation control unit 31 (step ST41). Then, the processing returns to step ST32 again, and the irradiation control unit 31 instructs the irradiating unit 41 to perform the irradiation with the multiple reference light beams having the different irradiation distances.

As mentioned above, according to this Embodiment 3, the irradiation control unit 31 instructs the irradiating unit 41 to perform the irradiation with the multiple reference light beams having the different irradiation distances, and also instructs the irradiating unit 41 to perform the irradiation with a selected one of the reference light beams on the basis of an occupant's instruction to select one reference light beam from the multiple reference light beams, the projection control unit 32 instructs the projecting unit 5 to perform the projection of an image in such a way that a virtual image corresponding to the irradiation distance of the selected one of the reference light beams is visually recognized by the occupant, and also controls either the image projection position or the image projection size on the basis of the occupant's instruction, the storage control unit 35 outputs an instruction to set to the calibration mode to the irradiation control unit 31 when the number of times that the occupant has provided an instruction to decide either the image projection position or the image projection size is less than the threshold, and the irradiation control unit 31 instructs the irradiating unit 41 to perform the irradiation with the multiple reference light beams having the different irradiation distances when acquiring the instruction to set to the calibration mode. By performing calibration at multiple positions having different distances, the accuracy of the calibration can be further improved.

In Embodiment 3, for example, when the threshold is set to 3, the calibration is performed three times. At this time, for example, it is assumed that the calibration is performed at positions 10 [m], 30 [m], and 50 [m] apart from a vehicle 10. In that case, for example, even in cases in which the driver is made to visually recognize a virtual image at positions 5 [m], 15 [m], 70 [m], 100 [m], etc. apart from the vehicle 10, the deviation between each of those positions and the position at which the virtual image is visually recognized can be prevented.

Embodiment 4

Because the configuration of a calibration system including a display control device 1 according to Embodiment 4 is the same as that shown in FIG. 1, an illustration of a block diagram is omitted.

Further, an explanation of components having the same functions as those of the components explained in Embodiment 1 or like functions will be omitted or simplified.

When acquiring operation information about a first switch, a projection position control unit 33 indicates both the projection position of an image for right eye and the projection position of an image for left eye, these images being projected onto a reflecting unit 6, to a projecting unit 5. It is assumed that the right-eye-image projection position and the left-eye-image projection position are image projection positions which cause a virtual image for right eye and a virtual image for left eye to be visually recognized at positions apart by the same distance as the irradiation distance of reference light from a predetermined point of a vehicle 10. Further, when acquiring the operation information about the first switch, the projection position control unit 33 indicates a horizontal distance (referred to as parallax between images hereafter) between the right-eye-image projection position and the left-eye-image projection position in the reflecting unit 6 to the projecting unit 5. The parallax between images is set in such a way that a three-dimensional stereoscopic virtual image is visually recognized through the reflecting unit 6.

When acquiring the operation information about the first switch, a projection size control unit 34 indicates both the projection size of the image for right eye and the projection size of the image for left eye, these images being projected onto the reflecting unit 6, to the projecting unit 5. It is assumed that the right-eye-image and left-eye-image projection sizes are image projection sizes which cause virtual images each having a size set to be suited to the irradiation distance of the reference light to be visually recognized.

When the image for right eye and the image for left eye which are projected by the projecting unit 5 are reflected by the reflecting unit 6 and inputted to the driver's eyes, a virtual image of the image for right eye and a virtual image of the image for left eye are visually recognized by the driver through the reflecting unit 6.

Hereafter, a default value of the parallax W1 between images, the default value being indicated to the projecting unit 5 by the projection position control unit 33, will be explained.

Figure 11:
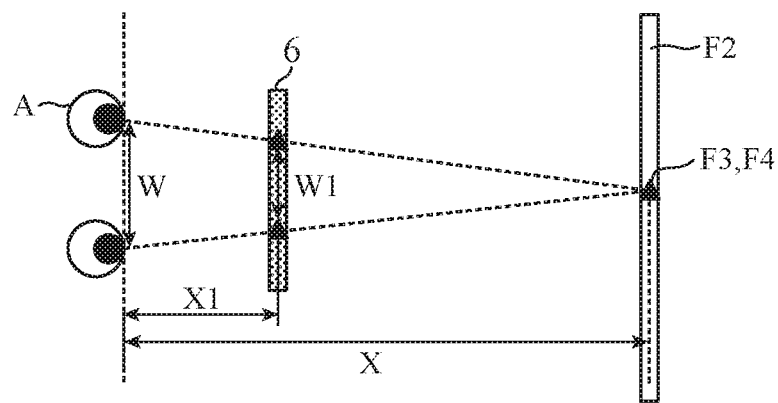
FIG. 11 is a view showing a situation in which a driver visually recognizes a virtual image and reference light.

FIG. 11 is a view showing a situation in which a driver A visually recognizes a virtual image F3, a virtual image F4, and the reference light F2. FIG. 11 shows a situation in which the virtual image F3 of the image for right eye and the virtual image F4 of the image for left eye are visually recognized at the same position as the irradiation position of the reference light F2, and the virtual image F3 of the image for right eye and the virtual image F4 of the image for left eye are superimposed on each other at the irradiation position of the reference light F2 without deviating from each other. The default value of the parallax W1 between images is set in the state shown in FIG. 11.

As shown in FIG. 11, the parallax W1 [cm] between images is the distance between the right-eye-image projection position and the left-eye-image projection position in the reflecting unit 6. When the distance between the right and left eyes of the driver is expressed by W [cm], the straight-line distance from the position of the driver's eyes to the position at which the virtual images are visually recognized is expressed by X [m], and the straight-line distance from the position of the driver's eyes to the positions of the images projected onto the reflecting unit 6 is expressed by X1 [m], the parallax W1 [cm] between images can be acquired using the following equation (3).

$$W1 = W \times (X - X1)/X1 \qquad (3)$$

In FIG. 11, it is assumed that X is 30 [m] and X1 is 3 [m]. Further, it is assumed that the value of W of the driver A is 5 [cm]. By substituting these values into the equation (3), W1=45 [cm] is calculated.

At this time, information showing that the parallax W1 between images is set to 45 [cm] when X is 30 [m] is stored as the default value in a storage unit 2 of the display control device 1.

An input unit 7 further includes a switch (referred to as a sixth switch hereafter) for selecting on which one of the virtual image of the image for right eye and the virtual image of the image for left eye calibration should be performed. The sixth switch can be constituted by a touch panel that enables input of information.

The projection position control unit 33 further acquires operation information about the sixth switch.

When acquiring operation information about a second switch, the projection position control unit 33 instructs the projecting unit 5 to make a change to the image projection position corresponding to the virtual image selected by the sixth switch, on the basis of the operation information about the second switch.

The projection size control unit 34 further acquires the operation information about the sixth switch. When acquiring operation information about a third switch, the projection size control unit 34 instructs the projecting unit 5 to make a change to the image projection size corresponding to the virtual image selected by the sixth switch, on the basis of the operation information about the third switch.

When acquiring operation information about a fourth switch, a storage control unit 35 stores the right-eye-image projection position and the left-eye-image projection position which the projection position control unit 33 indicates to the projecting unit 5, the right-eye-image projection size and the left-eye-image projection size which the projection size control unit 34 indicates to the projecting unit 5, or the parallax between images which the projection position control unit 33 indicates to the projecting unit 5 in the storage unit 2.

Next, operations will be explained.

Figure 12:
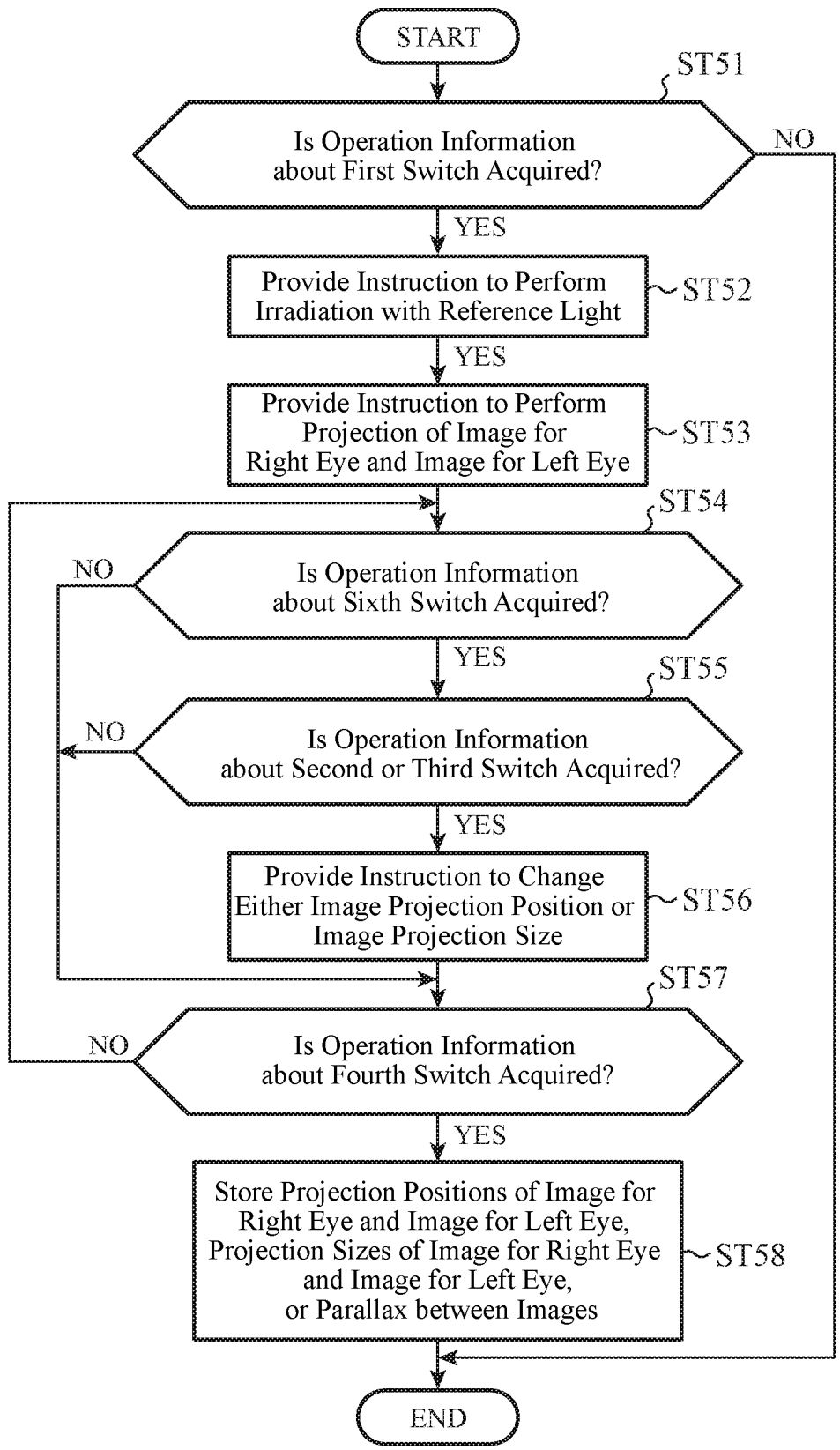
FIG. 12 is a flowchart showing the operation of a display control device according to Embodiment 4.

FIG. 12 is a flowchart showing the operation of the display control device 1 according to Embodiment 4.

A control unit 3 determines whether or not the operation information about the first switch is acquired (step ST51).

When the control unit 3, in step ST51, determines that the operation information about the first switch is acquired (YES in step ST51), the irradiation control unit 31 instructs the irradiating unit 41 to perform the irradiation with the reference light, the irradiation corresponding to irradiation distance information (step ST52).

In contrast, when the control unit 3, in step ST51, determines that the operation information about the first switch is not acquired (NO in step ST51), the processing is ended.

Next, the projection control unit 32 instructs the projecting unit 5 to perform the projection of both the image for right eye and the image for left eye in such a way that the virtual images corresponding to the irradiation distance information are visually recognized by the driver (step ST53).

Next, the projection control unit 32 determines whether or not the operation information about the sixth switch is acquired (step ST54).

When, in step ST54, determining that the operation information about the sixth switch is acquired (YES in step ST54), the projection control unit 32 advances to step ST55.

In contrast, when the projection control unit 32, in step ST54, determines that the operation information about the sixth switch is not acquired (NO in step ST54), the processing advances to step ST57.

Next, the projection control unit 32 determines whether or not operation information about either the second switch or the third switch is acquired (step ST55).

When, in step ST55, determining that the operation information about either the second switch or the third switch is acquired (YES in step ST55), the projection control unit 32 instructs the projecting unit 5 to make a change to either the image projection position or the image projection size corresponding to the virtual image selected by the sixth switch, on the basis of the operation information about either the second switch or the third switch (step ST56).

In contrast, when the projection control unit 32, in step ST55, determines that the operation information about either the second switch or the third switch is not acquired (NO in step ST55), the processing advances to step ST57.

Next, the storage control unit 35 determines whether or not the operation information about the fourth switch is acquired (step ST57).

When, in step ST57, determining that the operation information about the fourth switch is acquired (YES in Step ST57), the storage control unit 35 stores the right-eye-image projection position and the left-eye-image projection position which the projection position control unit 33 indicates to the projecting unit 5, the right-eye-image projection size and the left-eye-image projection size which the projection size control unit 34 indicates to the projecting unit 5, or the parallax between images which the projection position control unit 33 indicates to the projecting unit 5 in the storage unit 2 (step ST58). In contrast, when the storage control unit 35, in step ST57, determines that the operation information about the fourth switch is not acquired (NO in step ST57), the processing returns to step ST54.

Hereafter, a case in which a driver B different from the driver A gets in the vehicle and sits in the driver's seat, and the driver B performs the calibration of the parallax W1 between images will be explained.

Figure 13:
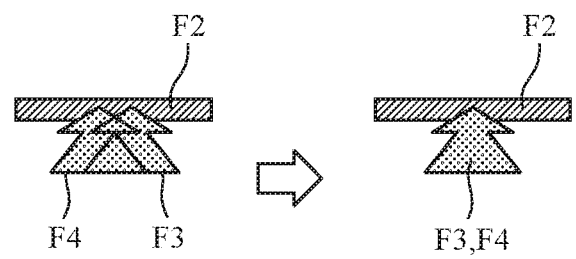
FIG. 13 is a view showing a situation in which a driver visually recognizes a virtual image and reference light.

FIG. 13 is a view showing a situation in which the driver B visually recognizes the virtual image F3, the virtual image F4, and the reference light F2. FIG. 13 shows a situation in which when the driver B operates the first switch, the virtual images F3 and F4 are visually recognized at the irradiation position of the reference light F2 by the driver B with the virtual images deviating from each other.

First, the driver B operates the sixth switch to select either the virtual image F3 or the virtual image F4. Next, the driver B changes the position at which the virtual image F3 or F4 selected by the sixth switch is visually recognized, by using the second switch, to superimpose the virtual images F3 and F4 on each other. The driver B can change the positions at which both the virtual images F3 and F4 are visually recognized, to superimpose the virtual images F3 and F4 on each other. The projection position control unit 33 instructs the projecting unit 5 to make a change to the image projection position corresponding to the virtual image selected by the sixth switch, on the basis of the operation information about the second switch.

Here, it is assumed that the projection position control unit 33 instructs the projecting unit 5 to change the parallax W1 between images from 45 [cm] which is the default value to 36 [cm].

When the driver B operates the fourth switch, the storage control unit 35 stores information showing that the parallax W1 between images is set to 36 [cm] when X is 30 [m] in the storage unit 2. At this time, a configuration can be provided in which the projection position control unit 33 calculates the value of W of the driver B by using the equation (3), and the storage control unit 35 stores the value of W in the storage unit 2. The value of W of the driver B is 4 [cm].

Although the case in which the virtual images F3 and F4 are visually recognized at the irradiation position of the reference light F2 with the virtual images deviating from each other is explained above, the virtual images F3 and F4 are aligned at the irradiation position of the reference light F2 when the virtual images F3 and F4 are apart from the irradiation position of the reference light F2.

As mentioned above, according to this Embodiment 4, the projection control unit 32 instructs the projecting unit 5 to perform the projection of both an image for right eye and an image for left eye in such a way that both a virtual image for right eye and a virtual image for left eye which correspond to the irradiation distance information are visually recognized by an occupant. As a result, the calibration can be performed also on the virtual images which are visually recognized as a three-dimensional stereoscopic image through the reflecting unit 6.

Embodiment 5

Because the configuration of a calibration system including a display control device 1 according to Embodiment 5 is the same as that shown in FIG. 1, an illustration of a block diagram is omitted.

Further, an explanation of components having the same functions as those of the components explained in Embodiment 1 or like functions will be omitted or simplified.

In Embodiment 5, an irradiating unit 41 is configured to be able to irradiate either a road surface on a side of a vehicle 10 or a road surface behind the vehicle 10 with reference light.

In the case of irradiating a road surface on a side of the vehicle 10 with the reference light, the irradiating unit 41 is mounted in, for example, the sun visor of a door in the vehicle 10.

In the case of irradiating a road surface behind the vehicle 10 with the reference light, the irradiating unit 41 is mounted on, for example, a rear side of the roof of the vehicle 10.

Figure 14A:
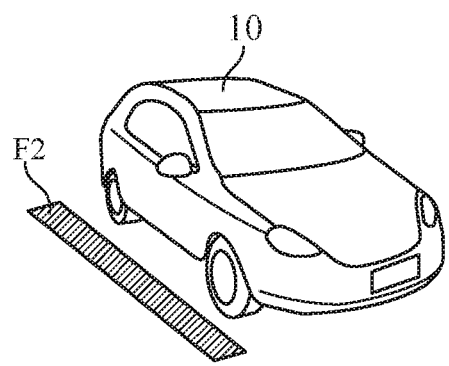
FIG. 14A and FIG. 14B are views showing examples of the irradiation with reference light.

FIG. 14A is a view showing an example of the irradiation with the reference light which is performed by the irradiating unit 41. FIG. 14A shows a situation in which the irradiating unit 41 irradiates a road surface on a side of the vehicle 10 with the reference light F2.

Figure 14B:
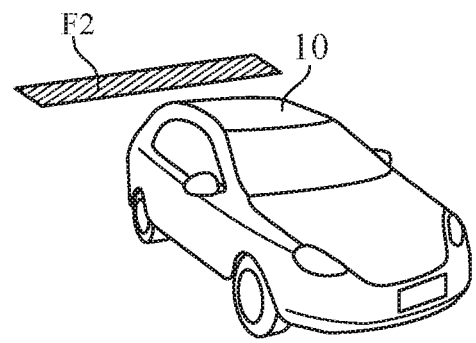

FIG. 14B is a view showing another example of the irradiation with the reference light which is performed by the irradiating unit 41. FIG. 14B shows a situation in which the irradiating unit 41 irradiates a road surface behind the vehicle 10 with the reference light F2.

In the case of irradiating a road surface on a side of the vehicle 10 and performing calibration, for example, the side window of a door of the vehicle 10 is constituted as a reflecting unit 6. Then, a projecting unit 5 is configured to project an image onto the reflecting unit 6. In this case, for example, an occupant in a rear seat of the vehicle 10 can visually recognize a virtual image based on the image through the side window.

In the case of irradiating a road surface behind the vehicle 10 with the reference light and performing calibration, for example, a rear window in the vehicle 10 is constituted as the reflecting unit 6. Then, the projecting unit 5 is configured to project an image onto the reflecting unit 6. In this case, for example, an occupant in a rear seat of the vehicle 10 can visually recognize a virtual image based on the image through the rear window.

By providing the configuration in the above-mentioned way, the calibration can be performed also on the virtual image which is visually recognized through the side window or the rear window.

As mentioned above, according to this Embodiment 5, the calibration can be performed also on a virtual image which is visually recognized through a side window or a rear window of the vehicle 10, and more flexible calibration can be implemented.

It is to be understood that any combination of two or more of the above-mentioned embodiments can be made, various changes can be made in any component according to any one of the above-mentioned embodiments, and any component according to any one of the above-mentioned embodiments can be omitted within the scope of the invention.

INDUSTRIAL APPLICABILITY

The display control device according to the present invention prevents a position at which a virtual image is visually recognized from deviating by adjusting the position at which the virtual image is visually recognized without using an image of an area in front of a vehicle, the image being captured by a camera, and is suitable for mounting in a vehicle.

REFERENCE SIGNS LIST 1 display control device, 2 storage unit, 3 control unit, 4 reference light irradiation device, 5 projecting unit, 6 reflecting unit, 7 input unit, 31 irradiation control unit, 32 projection control unit, 33 projection position control unit, 34 projection size control unit, 35 storage control unit, and 41 irradiating unit.

The invention claimed is:

1. A display control device mounted in a vehicle and comprising:
a processor; and
a memory storing instructions which, when executed by the processor, causes the processor to perform processes of:
controlling an irradiating unit that irradiates a road surface with reference light; and
controlling a projecting unit that projects an image onto a reflecting unit that reflects the image,
wherein the processor instructs the irradiating unit to perform irradiation with the reference light, the irradiation corresponding to set irradiation distance information,
the processor instructs the projecting unit to perform projection of an image in such a way that a virtual image corresponding to the irradiation distance information is visually recognized by an occupant of the vehicle, and also controls either a projection position or a projection size of the image projected by the projecting unit on a basis of an instruction of the occupant, and
the processes further comprise storing either the image projection position or the image projection size in a storage unit on a basis of the occupant's instruction to decide either the image projection position or the image projection size,
the processor stores either the image projection position or the image projection size which is adjusted in accordance with the reference light at a single irradiation distance or each of multiple different irradiation distances in the storage unit,
the processor acquires either the image projection position or the image projection size at a position apart by a freely selected distance from the vehicle, on a basis of either the image projection position or the image projection size stored in the storage unit,
the processor instructs the irradiating unit to perform irradiation with multiple reference light beams having different irradiation distances, and also instructs the irradiating unit to perform irradiation with one of the reference light beams which is selected on a basis of the occupant's instruction to select one reference light beam from the multiple reference light beams,
the processor instructs the projecting unit to perform the projection of the image in such a way that the virtual image corresponding to the irradiation distance of the selected one of the reference light beams is visually recognized by the occupant, and controls either the image projection position or the image projection size on a basis of the occupant's instruction,
the processor outputs an instruction to set to a calibration mode to the processor when a number of times that the occupant has provided the instruction to decide either the image projection position or the image projection size is less than a threshold, and
the processor instructs the irradiating unit to perform irradiation with the multiple reference light beams having the different irradiation distances when acquiring the instruction to set to the calibration mode.

2. A display control device mounted in a vehicle, comprising:
a processor; and
a memory storing instructions which, when executed by the processor, causes the processor to perform processes of:
controlling an irradiating unit that irradiates a road surface with reference light; and
controlling a projecting unit that projects an image onto a reflecting unit that reflects the image,
wherein the processor instructs the irradiating unit to perform irradiation with the reference light, the irradiation corresponding to set irradiation distance information,
the processor instructs the projecting unit to perform projection of an image in such a way that a virtual image corresponding to the irradiation distance information is visually recognized by an occupant of the vehicle, and also controls either a projection position or a projection size of the image projected by the projecting unit on a basis of an instruction of the occupant,
the processor instructs the irradiating unit to perform irradiation with multiple reference light beams having different irradiation distances, and also instructs the irradiating unit to perform irradiation with one of the reference light beams which is selected on a basis of the occupant's instruction to select one reference light beam from the multiple reference light beams, and
the processor instructs the projecting unit to perform the projection of the image in such a way that the virtual image corresponding to the irradiation distance of the selected one of the reference light beams is visually recognized by the occupant.

3. A display control device mounted in a vehicle and comprising:
a processor; and
a memory storing instructions which, when executed by the processor, causes the processor to perform processes of:
controlling an irradiating unit that irradiates a road surface with reference light; and
controlling a projecting unit that projects an image onto a reflecting unit that reflects the image,
wherein the processor instructs the irradiating unit to perform irradiation with the reference light, the irradiation corresponding to set irradiation distance information,
the processor instructs the projecting unit to perform projection of an image in such a way that a virtual image corresponding to the irradiation distance information is visually recognized by an occupant of the vehicle, and also controls either a projection position or a projection size of the image projected by the projecting unit on a basis of an instruction of the occupant, and
the processes further comprises storing either the image projection position or the image projection size in a storage unit on a basis of the occupant's instruction to decide either the image projection position or the image projection size,
the processor stores either the image projection position or the image projection size which is adjusted in accordance with the reference light at a single irradiation distance or each of multiple different irradiation distances in the storage unit, and
the processor acquires either the image projection position or the image projection size at a position apart by a freely selected distance from the vehicle, on a basis of either the image projection position or the image projection size stored in the storage unit.

4. The display control device according to claim 3, wherein the processor generates occupant information about the occupant, and stores the occupant information in the storage unit.

5. A display control device mounted in a vehicle and comprising:
a processor; and
a memory storing instructions which, when executed by the processor, causes the processor to perform processes of:
controlling an irradiating unit that irradiates a road surface with reference light; and
controlling a projecting unit that projects an image onto a reflecting unit that reflects the image,
wherein the processor instructs the irradiating unit to perform irradiation with the reference light, the irradiation corresponding to set irradiation distance information,
the processor instructs the projecting unit to perform projection of an image in such a way that a virtual image corresponding to the irradiation distance information is visually recognized by an occupant of the vehicle, and also controls either a projection position or a projection size of the image projected by the projecting unit on a basis of an instruction of the occupant, and
the processor instructs the projecting unit to perform projection of both an image for right eye and an image for left eye in such a way that both a virtual image for right eye and a virtual image for left eye which correspond to the irradiation distance information are visually recognized by the occupant.

6. The display control device according to claim 5, wherein the processor indicates both a projection position of the image for right eye and a projection position of the image for left eye to the projecting unit in such a way that both the virtual image for right eye and the virtual image for left eye are visually recognized at a position apart by a distance from the vehicle, the distance being identical to an irradiation distance of the reference light on a basis of the irradiation distance information.

7. The display control device according to claim 5, wherein the processor indicates both a projection size of the image for right eye and a projection size of the image for left eye to the projecting unit in such a way that both the virtual image for right eye and the virtual image for left eye each having a size which is set in accordance with an irradiation distance of the reference light on a basis of the irradiation distance information are visually recognized.

8. The display control device according to claim 5, wherein when acquiring the irradiation distance information, the processor indicates a horizontal distance between a projection position of the image for right eye and a projection position of the image for left eye in the reflecting unit to the projecting unit.

* * * * *